United States Patent
Park

(10) Patent No.: US 7,330,945 B2
(45) Date of Patent: Feb. 12, 2008

(54) RECORDING MEDIUM, AND METHOD AND APPARATUS FOR MANAGING DEFECTIVE AREAS OF RECORDING MEDIUM

(75) Inventor: Sung Baek Park, Kyounggi-do (KR)

(73) Assignee: Hitachi-LG Data Storage Korea, Inc., Seoul (KR)

(*) Notice: Subject to any disclaimer, the term of this patent is extended or adjusted under 35 U.S.C. 154(b) by 576 days.

(21) Appl. No.: 10/895,344

(22) Filed: Jul. 21, 2004

(65) Prior Publication Data

US 2005/0025004 A1  Feb. 3, 2005

(30) Foreign Application Priority Data

Jul. 21, 2003  (KR) .................. 10-2003-0049879

(51) Int. Cl.
*G06F 12/00* (2006.01)
*G11B 27/37* (2006.01)

(52) U.S. Cl. .............. 711/159; 711/112; 714/710; 369/53.17

(58) Field of Classification Search ........ 711/159, 711/112, 710; 369/53.17
See application file for complete search history.

(56) References Cited

U.S. PATENT DOCUMENTS

| | | | | |
|---|---|---|---|---|
| 5,241,531 A | * | 8/1993 | Ohno et al. | 369/275.2 |
| 5,844,911 A | * | 12/1998 | Schadegg et al. | 714/710 |
| 6,189,110 B1 | * | 2/2001 | Saitoh et al. | 714/8 |
| 6,341,109 B1 | * | 1/2002 | Kayanuma | 369/47.14 |
| 6,725,400 B1 | * | 4/2004 | Ko | 714/42 |
| 6,747,929 B1 | * | 6/2004 | Ko et al. | 369/53.17 |

* cited by examiner

*Primary Examiner*—Thang V. Tran
(74) *Attorney, Agent, or Firm*—Birch, Stewart, Kolasch & Birch, LLP

(57) ABSTRACT

A recording medium and a method and apparatus for managing defective areas of the recording medium are provided. The method includes allocating, in a data recording direction, a spare area of a certain size in an information area of the recording medium as a data recording operation is performed, if a defective area is detected during the data recording operation; and performing a replacement recording operation onto the allocated spare area to record in the allocated spare area, data intended for the defective area.

24 Claims, 5 Drawing Sheets

```
SpareAreaManagementInformation(){
    size_of_spare_area
    number_of_spare_areas
    for(i=0; i<number_of_spare_areas; i++){
        PSN
        full_flag
        number_of_reserved
        for(j=0; j<number_of_replaced_defect_areas; j++){
            PSN_defect_area
            }
        - - - - -
        }
    }
```

FIG.4

RECORDING MEDIUM, AND METHOD AND APPARATUS FOR MANAGING DEFECTIVE AREAS OF RECORDING MEDIUM

The present application claims, under 35 U.S.C. § 119, the priority benefit of Patent Application No. 2003-49879 filed Jul. 21, 2003 in Republic of Korea, the entire contents of which are herein fully incorporated by reference.

BACKGROUND OF THE INVENTION

1. Field of the Invention

The present invention relates to a defect management method for a recording medium, and more particularly to a structure of a writable optical disc and a method and apparatus for managing defective areas of the writable optical disc.

2. Description of the Related Art

Recently, new high-density optical discs, which can store a large quantity of high-quality video and audio data, have been developed. In accordance with such development, blu-ray disc rewritable (BD-RE) and blu-ray disc write-once (BD-WO) are expected to be commercially available in the near future.

Referring to FIG. 1, the structure of a BD-RE is illustrated. As shown in FIG. 1, the BD-RE has a lead-in area (LIA), an information area, and a lead-out area (LOA). Also, an inner spare area (ISA) and an outer spare area (OSA) are assigned at the leading and trailing ends of the information area. The LIA includes a defect management area (DMA). The DMA stores disc definition structure (DDS) information and defect list (DFL) information required for management of defective areas.

An optical disc apparatus records and reproduces data to and from the BD-RE of FIG. 1. Particularly, the optical disc apparatus encodes and modulates data, externally inputted thereto, into a signal suitable to be recorded, and records the modulated signal on the BD-RE in the unit of clusters each corresponding to an error correction code (ECC) block. When the optical disc apparatus detects a defective area in the information area of the BD-RE during the recording operation, as shown in FIG. 1, it performs, in a spare area of the BD-RE, replacement recording of the cluster-based data to be recorded in the detected defective area.

The optical disc apparatus also manages the DFL information used to access data recorded in the spare area of the BD-RE as replacement data. The DFL information includes a plurality of defect entries Defect_Entry #1, #2, #3, . . . each having a fixed size of, for example, 4 clusters. Positional information about a defective area ("Physical Sector Number (PSN) of Defective"), and positional information about a spare area in which replacement data corresponding to data to be recorded in the defective area has been recorded ("PSN of Replacement"), are recorded and associated with each other, in each defect entry.

When the optical disc apparatus detects a defective area during an operation of recording data in the information area of the BD-RE, it performs, in a spare area of the BD-RE, replacement recording of cluster-based data to be recorded in the detected defective area, generates associated DFL information, and records the generated DFL information. Upon subsequently performing a reproduction operation, the optical disc apparatus reads and reproduces the replacement data recorded in the spare area while referring to the recorded DFL information. Thus, it is possible to prevent erroneous recording of data.

When a defective area on the BD-RE is detected during an operation of recording data in the information area of the BD-RE, it is necessary to jump an optical pickup of the optical disc apparatus to a spare area of the BD-RE so as to record cluster-based data, to be recorded in the detected defective area, in the spare area as replacement data. After completion of the replacement data recording operation, it is also necessary to again jump the optical pickup to a position, which follows the position of the detected defective area, to continue with the recording operation. For this reason, the structure and use of the BD-RE of FIG. 2 have a problem of requiring a longer recording operation time. Furthermore, the jumping operations may generate errors since they require optical elements of the optical disc apparatus to be moved quickly and precisely.

Moreover, where such a large inner spare area or outer spare area is assigned to completely record replacement data corresponding to data of all defective areas, the data recording capacity of the optical disc is excessively reduced. On the other hand, where a small inner spare area or outer spare area is assigned, the possibility of generation of errors during the replacement data recording operation may increase.

SUMMARY OF THE INVENTION

Therefore, the present invention has been made to address the above mentioned problems and other problems associated with the related art.

Accordingly, an object of the invention is to provide a structure of a recording medium and a defect management method and apparatus for the recording medium, which are capable of recording, in a spare area of the recording medium, replacement data corresponding to data to be recorded in a defective area detected during an operation of recording data in an information area of the recording medium, with a reduced recording operation speed.

Another object of the invention is to provide a structure of a recording medium, and a defect management method and apparatus for the recording medium that are capable of appropriately adjusting the total size of spare areas of the recording medium assigned to record data in place of defective areas.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above objects, and other features and advantages of the present invention will become more apparent after reading the following detailed description when taken in conjunction with the drawings, in which:

FIG. 4 is a schematic view illustrating spare area management information used in the defect management method of FIG. 3 according to the first embodiment of the present invention.

DETAILED DESCRIPTION OF PREFFERRED EMBODIMENTS

Hereinafter, a structure of a recording medium and a defect management method and apparatus for the recording medium according to the present invention will be described in conjunction with preferred embodiments thereof with reference to the annexed drawings.

Figure 2:
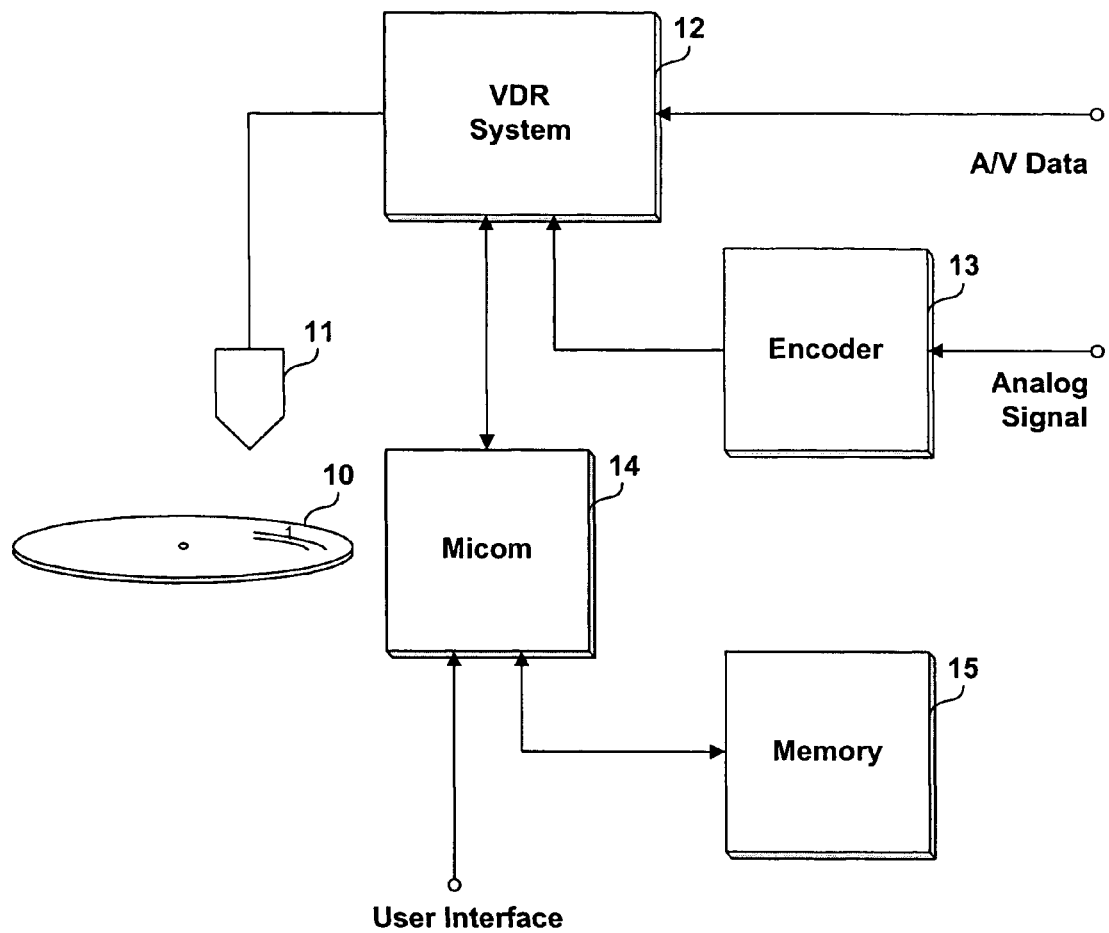
FIG. 2 is a block diagram schematically illustrating the configuration of an optical disc apparatus according to an embodiment of the present invention.

FIG. 2 illustrates an optical disc apparatus by which the present method can be implemented. The optical disc apparatus of FIG. 2 can record and/or reproduce data to and/or from an optical disc 11 such as a BD-RE or a BD-WO.

As shown in FIG. 2, the optical disc apparatus includes an optical pickup 11 for recording data on the optical disc 10 or reproducing data from the optical disc 10, a video disc recorder (VDR) system 12 for processing a signal read by the optical pickup 11, and modulating a data stream, externally inputted thereto, into a signal suitable to be recorded, and an encoder 13 for encoding an analog signal externally inputted thereto, and outputting the encoded signal to the VDR system 12. The optical disc apparatus also includes a microcomputer 14 for controlling data recording and reproducing operations in accordance with key inputs from the user, and a memory 15 for storing navigation information required to control the operations. All the components of the optical disc apparatus of FIG. 2 are operatively coupled.

The present invention may be applied to a variety of writable optical discs such as BD-WO and BD-RE. Also, the present invention may be applied to the optical disc apparatus of FIG. 1 or any other suitable device/system.

Figure 3:
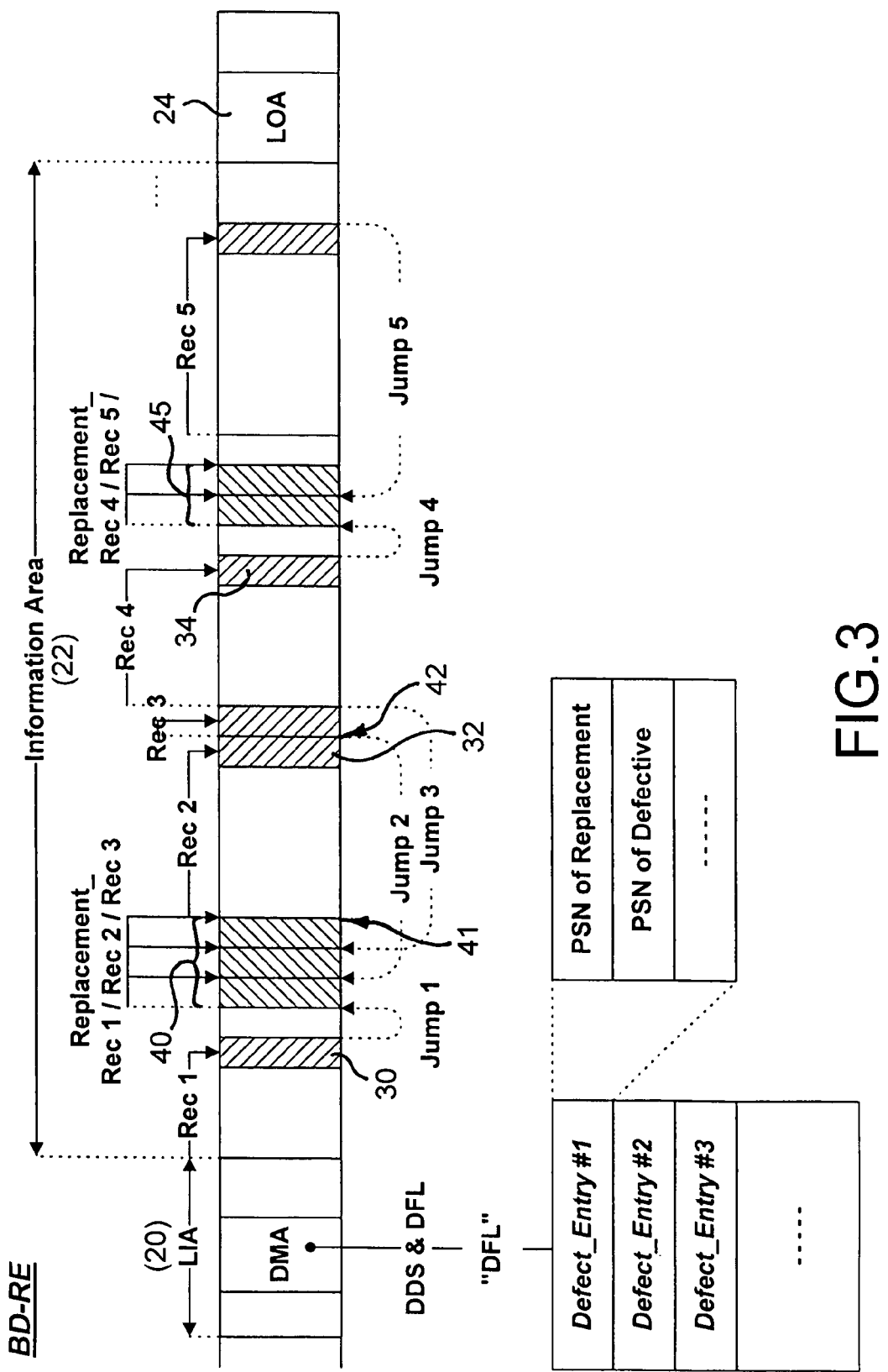
FIG. 3 is a schematic view illustrating a structure of a recording medium and a defect management method for the recording medium in accordance with a first embodiment of the present invention.

FIG. 3 is a view illustrating a structure of a recording medium such as a BD-RE and a defect management method of the recording medium in accordance with the first embodiment of the present invention. As shown in FIG. 3, the BD-RE has a lead-in area 20 (LIA), an information area 22, and a lead-out area 24 (LOA), and need not have any inner spare area (ISA) or outer spare area (OSA) separately assigned to record replacement data corresponding to data to be recorded in a defective area. That is, there are no designated ISA and OSA allocated on the BD-RE according to the first embodiment of the present invention.

The defect management method of the BD-RE of FIG. 3 according to the first embodiment of the present invention will be now discussed as the method is implemented by the optical disc apparatus of FIG. 2.

The VDR system 12 encodes and modulates data, externally inputted thereto, into a signal suitable to be recorded, and records the modulated signal on the BD-RE of FIG. 3 in the unit of clusters each corresponding to an ECC block. When the VDR system 12 detects a defective area in the information area of the BD-RE during the data recording operation, it assigns a spare area (replacement area) having a predetermined size at a position spaced apart from the detected defective area in a data recording direction by a predetermined distance, in order to record cluster-based data, to be recorded in the detected defective area, in the assigned spare area as replacement data, in accordance with the present invention.

For example, as shown in FIG. 3, where the VDR system 12 detects a defective area 30 while recording data (Rec 1) in the information area 22, it assigns a spare area 40 (replacement area) having a predetermined size to the information area 22 at a position spaced apart from the detected defective area 30 in a data recording direction by a predetermined distance, while jumping (Jump 1) the optical pickup 11 from the defective area 30 to the first position of the assigned spare area 40. Thereafter, the VDR system 12 performs, in the assigned spare area 40, replacement recording of data to be recorded in the defective area 30. This process is indicated as "Replacement_Rec 1" in FIG. 3.

The size of the assigned spare area 40 is determined such that data to be respectively recorded in several defective areas, which are subsequently detected, can be additionally recorded in the spare area 40 assigned as described above. However, it may be difficult to estimate the number of defective areas to be subsequently detected. Therefore, the spare area 40 has a size determined to record the amount of cluster-based data recordable in a predetermined number of defective areas. Thus, the size of the assigned spare area 40 corresponds to n clusters (here, "n" is a natural number corresponding to the number of detected defective areas). In the example of FIG. 3, the size of the assigned spare area 40 corresponds to 3 clusters.

After the process of Replacement_Rec 1 is performed, the VDR system 12 again performs the data recording operation (Rec 2) from a position 41 following the end of the assigned spare area 40. During this process, if another defective area 32 is subsequently detected, the VDR system 12 jumps (Jump 2) the optical pickup 11 to a portion of the assigned spare area 40, for which replacement recording of data has not been carried out yet, and then performs, in that portion of the assigned spare area 40, replacement recording of data to be recorded in the subsequently detected defective area 32. This process is indicated as "Replacement_Rec 2" in FIG. 3. Thereafter, the VDR system 12 again performs the data recording operation (Rec 3) from a position 42 following the subsequently detected defective area 32. If a defect is found in the area of the Rec 3 operation, then the VDR system 12 jumps (Jump 3) the optical pickup 11 to a portion of the assigned spare area 40 that has not been used to carry out the replacement recording. Such replacement recording operations are carried out until the assigned spare area 40 is completely filled with data.

If the VDR system 12 detects a defective area while recording data (Rec 4) under the condition in which the assigned spare area 40 is completely filled with data, it again performs the above-described operations, that is, operations of assigning a spare area having a predetermined size at a position spaced apart from the detected defective area in a data recording direction by a predetermined distance, while jumping the optical pickup 11 from the defective area to the position of the newly assigned spare area and performing, in the newly assigned spare area, replacement recording of data to be recorded in the detected defective area.

For instance, as shown in FIG. 3, during the recording of data (Rec 4), if a defective area 34 is discovered, then the VDR system 12 assigns a new spare area 45 since the first assigned spare area 40 is full. Then the jumping operation (Jump 4) is carried out, and the replacement recording (Replacement_Rec 4) of data to be recorded in the detected defective area 34 is performed into the first available portion of the spare area 45. This process (e.g., Rec 5, Jump 5, Replacement_Rec 5, etc.) is repeated as needed to complete the data recording operation in the information area 22.

Meanwhile, when the VDR system 12 detects a defective area while recording data under the condition in which the assigned spare area is incompletely filled with data, there may be an occasion that the distance between the assigned spare area and the currently detected defective area is too far, so that the optical pickup needs to travel back and forth an excessively long distance for the replacement recording operation and the subsequent normal recording operation. In order to avoid such an excessive reciprocating movement of the optical pickup, it is possible according to the present invention to assign a new spare area having a predetermined size at a position spaced apart from the newly detected defective area in a data recording direction by a predetermined distance to perform replacement recording of data in the currently assigned spare area in place of the previously assigned spare area.

Figure 1:
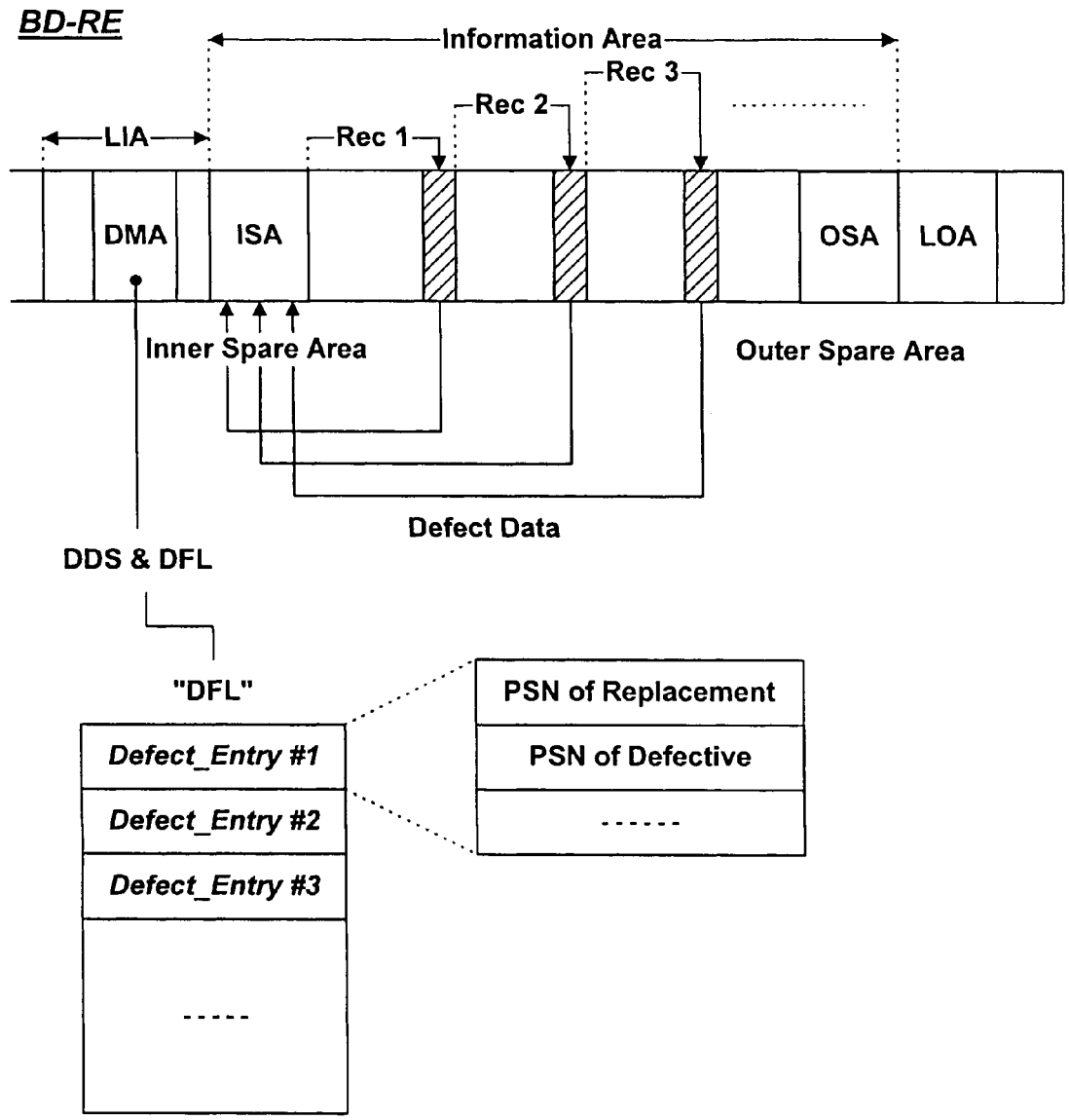
FIG. 1 is a schematic view illustrating a defect management method for a writable optical disc according to a related art.

In this case, it is unnecessary to reciprocate the optical pickup by a long distance between the current recording position and the inner or outer spare area for the replacement recording operation and the subsequent normal recording operation, as in the case of FIG. 1. Accordingly, the present invention achieves an enhancement in the data recording speed.

In most cases, however, assignment of a new spare area is carried out, only when a defective area is detected under the condition in which there is no spare area having sufficient space for replacement recording of data. Thus, it is possible to appropriately assign a spare area having a size required for replacement recording of data, when the spare area is needed.

Meanwhile, when a defective area is detected, the VDR system 12 manages DFL information which includes defect entries. The DFL information according to the present invention is used to access data recorded in the assigned spare area(s) (e.g., the spare areas 40 and 45) as replacement data associated with the detected defective area, as shown in FIG. 3. When the data recording operation is stopped, or a predetermined number of defective areas or more are detected, the VDR system 12 also records the DFL information.

The DFL information may include a plurality of defect entries Defect_Entry #1, #2, #3, . . . each having a fixed size of, for example, 4 clusters. Positional information about a defective area, "Physical Sector Number (PSN) of Defective", and positional information about the portion of the spare area in which replacement data corresponding to data to be recorded in the defective area has been recorded, "PSN of Replacement", are recorded and are associated with each other, in each defect entry. The DFL information, which includes a plurality of defect entries as described above, is recorded in one or more defect management areas (DMAs) assigned to the LIA 20 and the LOA 24. The DFL information is managed along with disc definition structure (DDS) information adapted to manage defective areas.

In order to manage spare areas assigned to record data in place of defective areas, the VDR system 12 may manage spare area management information (SAMI) according to the present invention. As shown in FIG. 4, the SAMI may include the size of a spare area (size_of_spare_area), the number of assigned spare areas (number_of_spare_areas), positional information about each spare area (PSN), a flag full_flag representing full replacement recording of data in each spare area, the number of defective areas reserved for subsequent replacement recording of data in each spare area (number_of_reserved), and positional information about defective areas, for which replacement recording of data has been carried out in each spare area (PSN_defect_area). The SAMI may be managed in association with the DFL. When a data recording operation is stopped, the VDR system 12 may record the SAMI in the DMA(s), so as to manage the SAMI along with the DDS information In accordance with a second embodiment of the present invention, as shown in FIG. 5, the BD-RE has an LIA 20, an information area 22, and an LOA 24, and may have an ISA 26 having a predetermined size, and an OSA 28 having a predetermined size.

Figure 5:
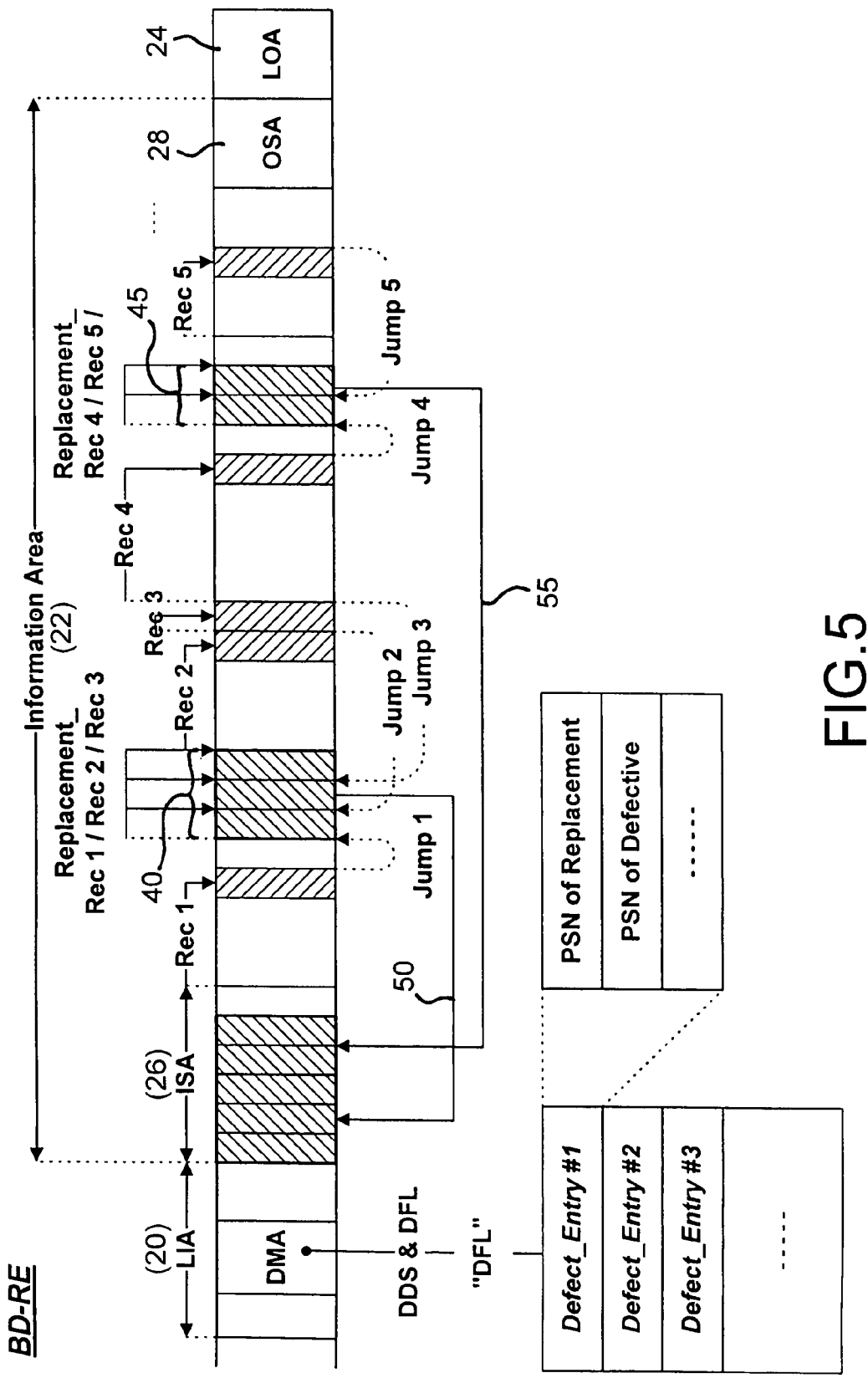
FIG. 5 is a schematic view illustrating a structure of a recording medium and a defect management method for the recording medium in accordance with a second embodiment of the present invention.

The second embodiment of the present invention is similar to the first embodiment described in conjunction with FIG. 3, except that, as shown in FIG. 5, when a data recording operation is stopped or when a predetermined number of defective areas are detected, data is read from all spare areas (e.g., spare area 40 and/or 45 in FIG. 5) used to record data in place of the detected defective areas, and the read data is collectively recorded (copied) in a selected one of the ISA 26 and OSA 28 as replacement data. This process is indicated by reference numerals 50, 55. In accordance with the second embodiment, the spare areas (e.g., 40 and 45 in FIG. 5), which are assigned to record data in place of defective areas detected during an operation of recording data in the information area, are temporary areas. Accordingly, it is possible to subsequently record data in the temporary areas, that is, the spare areas.

In this case, DFL information is generated which will be used to access data recorded in the ISA or OSA as replacement data. The DFL information is recorded in the DMA(s) in the LIA 20 and the LOA 24. Positional information about a defective area, "PSN of Defective", and positional information about the portion of the ISA or OSA in which replacement data corresponding to data to be recorded in the defective area has been recorded, "PSN of Replacement", are recorded, and are associated with each other, in each defect entry of the DFL information.

In accordance with the second embodiment of the present invention, an enhancement in the data recording speed is achieved, as in the first embodiment. It is also possible to secure a desired compatibility with other optical discs because data of defective areas recorded in temporary areas in the information area in a distributed manner is again recorded in the ISA or OSA as replacement data.

As apparent from the above description, the present invention provides an advantage in that it is unnecessary to reciprocate the optical pickup over a long distance between the current recording position and the ISA or OSA for the replacement recording operation associated with a defective area detected during a data recording operation and the subsequent normal recording operation.

In accordance with the present invention, it is possible to record more quickly, in a spare area, replacement data corresponding to data to be recorded in a defective area detected during a data recording operation.

In accordance with the present invention, spare areas each having a size required for replacement recording of data are assigned. Accordingly, it is possible to appropriately adjust the size of each spare area, thereby resulting in a more effective use of the disc space.

Also, the present invention can secure a desired compatibility with other optical discs while achieving an enhancement in data recording speed.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A defect management method for a recording medium, the method comprising:
   (a) assigning a spare area on the recording medium at a position spaced apart, by a predetermined distance, from a position where a defective area is present, when the defective area is detected during a data recording operation;
   (b) recording, in the assigned spare area, data of a predetermined size to be recorded at the defect-detected position, as replacement data; and
   (c) continue to perform the data recording operation from a position following the assigned spare area,
   wherein the assigned spare area has a size determined to record an amount of data recordable in a predetermined number of defective areas, and
   wherein the method further comprises:
   (g) collectively recording the replacement data, which has been recorded in the assigned spare area, in at least one of inner and outer spare areas pre-designated to the recording medium.

2. The defect management method according to claim 1, further comprising:
   (d) managing information about spare areas and/or information about defective areas upon performing the recording (b).

3. The defect management method according to claim 2, wherein the information about spare areas comprises at least one of the following:
   a spare area size,
   a number of assigned spare areas,
   positional information about each spare area,
   a flag representing full replacement recording of data in each spare area,
   a number of defective areas reserved for subsequent replacement recording of data in each spare area, and
   positional information about defective areas, for which replacement recording of data has been carried out in each spare area.

4. The defect management method according to claim 2, wherein the information about defective areas comprises positional information about respective defective areas, and positional information about respective portions of spare areas in which replacement data corresponding to data to be recorded in each defective area has been recorded.

5. The defect management method according to claim 2, further comprising:
   (e) when a new defective area is detected and the spare area assigned in the step (a) is full, re-performing the steps (a), (b), and (c) based on the new defective area.

6. The defect management method according to claim 2, further comprising:
   (f) recording the information about spare areas and/or information about the defective areas in a particular area of the recording medium.

7. The defect management method according to claim 6, wherein the particular area is a defect management area allocated in a lead-in area or a lead-out area of the recording medium.

8. The defect management method according to claim 1, further comprising:
   (h) recording information about defective areas in a defect management area assigned to at least one of a lead-in area and a lead-out area of the recording medium.

9. The defect management method according to claim 1, wherein the recording medium is a writable optical disc.

10. A method of managing defective areas on a recording medium, the recording medium including an information area, the method comprising:
    allocating, in a data recording direction, a spare area of a certain size in the information area as a data recording operation is performed, if a defective area is detected during the data recording operation; and
    performing a replacement recording operation onto the allocated spare area to record in the allocated spare area, data intended for the defective area,
    wherein the recording medium has at least one pre-designated spare area, and the method further comprises:
    copying data recorded in the allocated spare area into the at least one pre-designated spare area of the recording medium.

11. The method of claim 10, further comprising:
    continuing with the data recording operation from an area following the end of the allocated spare area, after performing the replacement recording operation.

12. The method of claim 11, further comprising:
    performing a replacement recording operation onto an unused portion of the allocated spare area if another defective area is discovered during the data recording operation.

13. The method of claim 10, further comprising:
    allocating, in the data recording direction, a second spare area of a certain size in the information area as the data recording operation is performed, if another defective area is detected during the data recording operation and if the first allocated spare area is full.

14. The method of claim 10, further comprising:
    recording, in a defect management area of the recording medium, management information pertaining to the defective area and the allocated spare area.

15. The method of claim 10, further comprising:
    recording, in a defect management area of the recording medium, management information pertaining to the defective area and the at least one pre-designated spare area.

16. A recording medium comprising:
    a recording layer;
    an information area allocated on the recording layer; and
    a spare area of a certain size allocated, in a data recording direction, in the information area as a data recording operation is performed, if a defective area is detected during the data recording operation,
    wherein a replacement recording operation is performed onto the allocated spare area to record in the allocated spare area, data intended for the defective area, and
    wherein the recording medium has at least one pre-designated spare area, and data recorded in the allocated spare area are copied into the at least one pre-designated spare area of the recording medium.

17. The recording medium of claim 16, wherein the data recording operation is continued from an area following the end of the allocated spare area, after the replacement recording operation is performed.

18. The recording medium method of claim 17, wherein a replacement recording operation is performed onto an unused portion of the allocated spare area if another defective area is discovered during the data recording operation.

19. The recording medium of claim 16, further comprising:
   a second spare area of a certain size allocated, in the data recording direction, in the information area as the data recording operation is performed, if another defective area is detected during the data recording operation and if the first allocated spare area is full.

20. The recording medium of claim 16, further comprising:
   a defect management area on the recording layer for storing management information pertaining to the defective area and the allocated spare area.

21. The recording medium of claim 16, further comprising:
   a defect management area on the recording layer for storing management information pertaining to the defective area and the at least one pre-designated spare area.

22. An apparatus for managing defective areas on a recording medium, the recording medium including an information area, the apparatus comprising:
   a recording/reproducing part to allocate, in a data recording direction, a spare area of a certain size in the information area as a data recording operation is performed, if a defective area is detected during the data recording operation, and to perform a replacement recording operation onto the allocated spare area to record in the allocated spare area, data intended for the defective area,
   wherein the recording medium has at least one pre-designated spare area, and the recording/reproducing part copies data recorded in the allocated spare area into the at least one pre-designated spare area of the recording medium.

23. The apparatus of claim 22, wherein the recording/reproducing part continues with the data recording operation from an area following the end of the allocated spare area, after performing the replacement recording operation.

24. The apparatus of claim 23, wherein the recording/reproducing part allocates, in the data recording direction, a second spare area of a certain size in the information area as the data recording operation is performed, if another defective area is detected during the data recording operation and if the first allocated spare area is full.

* * * * *